United States Patent

Maehara et al.

[11] 4,336,711
[45] Jun. 29, 1982

[54] GEAR MESH TESTING INSTRUMENTS

[75] Inventors: Osamu Maehara, Kawasaki; Tsutomu Harada, Yokohama, both of Japan

[73] Assignee: Ono Sokki Co., Ltd., Tokyo, Japan

[21] Appl. No.: 97,660

[22] Filed: Nov. 27, 1979

[30] Foreign Application Priority Data

Dec. 11, 1978 [JP] Japan ............................ 53-153471

[51] Int. Cl.³ .......................................... G01M 13/02
[52] U.S. Cl. ................................................... 73/162
[58] Field of Search ........................ 73/162; 324/161; 33/179.5 R

[56] References Cited

U.S. PATENT DOCUMENTS 3,096,590 7/1963 Stepanek ............................. 324/161
3,900,796 8/1975 Rose .................................... 324/161
3,922,910 12/1975 Dickenson ............................. 73/162

Primary Examiner—S. Clement Swisher
Attorney, Agent, or Firm—Birch, Stewart, Kolasch & Birch

[57] ABSTRACT

The present invention relates to a gear mesh testing instrument in which the transmission error occurring between the two gears to be tested (the driving gear and the driven gear) is measured while both gears are rotating while intermeshed with each other. A pulse generator is connected to the rotating shaft of the driving gear, and of the driven gear, respectively, so as to produce two pulse signals having frequencies proportional to the number of the rotation of the gears. Then, the two pulse signals are introduced into the gear number compensating circuit so as to be converted into two pulse signals having a same frequency. The transmission error is proportional to the phase difference between the two pulse signals having the same frequency, which phase difference is proportional to the ratio of the phase difference time between the two pulse signals to the period of pulse signal. As a consequence, the phase difference time is converted into a clock pulse number by means of the time difference calculation circuit, while at the same time the reciprocal of the period is calculated by means of a reciprocal calculation circuit. The clock pulse number and reciprocal of the period are multiplied in a multiplier so as to obtain the phase difference.

3 Claims, 3 Drawing Figures

GEAR MESH TESTING INSTRUMENTS

BACKGROUND OF THE INVENTION

1. Field of the Invention

The present invention relates to a single flank tester, particularly capable of measuring the transmission error taking place between the gears meshed with each other with a high resolution even at a rotational speed close to that used in the desired application.

2. Description of the Prior Art

FIG. 1 shows a block diagram of the conventional single flank tester.

In FIG. 1, the two gears to be tested 1 and 2 are respectively mounted on the shafts 11 and 21, making one body therewith, whereby in order that the two gears 1 and 2 are meshed with each other at a certain determined distance between the centers of the gears, the shafts 11 and 21 are rotatably held on the bearings (not shown in the drawing) at a certain distance between them. The shaft 11 projects on both side of the gear 1, whereby the rotation shaft of the motor 3 is connected to the end of the one projecting shaft (the left projecting shaft in FIG. 1). In consequence, when the motor 3 is rotated at n(rps), the gear 1 is also rotated at n(rps). Supposing now that the tooth number of the gear 1 be Z1, while that of the gear 2 be Z2, the rotation number (Z1/Z2)n(rps) is transmitted to the gear 2. As explained above the gear 1 is driven by means of the motor 3 while the rotation number is transmitted to the gear 2, so that hereinafter the gear 1 is called the driving gear, while the gear 2 is called the driven gear.

12 and 22 are the pulse generators, being mounted on the shaft 11 of the driving gear 1 respectively on the shaft 21 of the driven gear 2. The pulse generators 12, 22 consist of, for example, of a slit disc secured on the shaft and two sets of a light source and a phototransistor, whereby the light source and the phototransistor are diametrically opposed with reference to the slit disc. The slit disc is provided with P slit at an equal distance between adjacent ones, while one set of a light source and a phototransistor is mounted at a first position and the other set if displaced at a distance of ¼ of the adjacent slit spacings. As a consequence, the phototransistors produce P signals per rotation of the shafts, whereby the phase of the one signal is shifted from the other by 90°. Thus, the signals are led to the multiplier circuit provided inside or outside of the pulse generators 12 and 22 so as to be multiplied with m and shaped in pulse forms in such a manner that mP pulse signals are produced per rotation of the shaft.

As a consequence, when the motor 3 rotates at n(rps), the shafts 11 and 21 rotate at n(rps), and respectively (Z1/Z2)n(rps), so that the frequencies f1 and f2 of the pulse signals produced with the pulse generators 12 and 22 are as follows.

$$f_1 = mP \cdot n \text{ (Hz)} \\ f_2 = mP \cdot (Z_1/Z_2)n \text{ (Hz)} \quad \} \quad (1)$$

The pulse signals produced with the pulse generators 12 and 22 are led to the tooth number compensation circuits 13 and 23. The tooth number compensation circuit 13 consists of a frequency dividing circuit, whereby the frequency dividing ratio is set at the reciprocal value of the number of teeth in the other gear meshed with the gear it is associated with. Thus, the frequency dividing ratios of the tooth number compensation circuits 13 and 23 are respectively 1/Z2 and 1/Z1. Consequently, the pulse signals produced by means of the pulse generators 12 and 22 are multiplied by 1/Z2 and 1/Z1 by the frequency division in such a manner that the frequencies f1' and f2' delivered from the tooth number compensation circuits 12 and 22 become equal to each other as follows.

$$f_1' = f_1/Z_2 = Pmn/Z_2 \text{ (Hz)} \\ f_2' = f_2/Z_1 = Pm \cdot (Z_1/Z_2)nZ_1 = Pmn/Z_2 \text{ (Hz)} \quad \} \quad (2)$$

Thus, the conversion into the two pulse signals of the same frequency (f1', f2') means that every time the gears 1 and 2 rotate a certain determined equal distance on the intermeshing pitch circle along which the driving gear 1 and the driven gear 2 are intermeshed, one pulse signal is produced by each compensation circuit. Thus, in case there is a transmission error between the gears 1 and 2, a phase difference proportional to the transmission error occurs between the two pulse signals of the same frequency (f1', f2').

Below, how to obtain the transmission error between the gears 1 and 2 out of the measured phase difference will be explained.

The phase difference is proportional to the phase difference time between the two pulse signals and reciprocal to the period of the pulse signal. In other words, the phase difference is proportional to the product of the phase difference time and the frequency of the pulse signal. The reason is that the phase difference time is one half of the time between pulses when the frequency of the pulse signal is two times as large (period: ½) even when the phase difference is same. Consequently, in order to obtain the phase difference, the phase difference time between the two pulse signals of the same frequency (f1', f2') produced by means of the tooth number compensation circuits 13 and 23 must be obtained, whereby the pulse signal with the frequency f1 produced by means of the pulse generator 12 is put in the phase difference time interval so as to count the interpolated pulse number. However, the ratio of the pulse signal with the frequency f1 for interpolation with that (f1', f2') for obtaining the phase difference time interval is, as is clear from the equation (2), the number of teeth (Z2) of the driven gear 2, so that when Z2 is small, the ratio is also naturally small. Thus, the number of the pulse signals with the frequency f1 to be interpolated in the phase difference time interval becomes also remarkably small for the above mentioned calculation method. In order to avoid this, the pulse signals of the same frequency (f1', f2') produced by means of the tooth number compensation circuits 13 and 23 are at first led to the frequency dividing circuits 14 and 24 so as to be divided with a same corresponding frequency dividing ratio 1/l in order that the frequency f1', f2' is stepped down to f1'/l, f2'/l. Then, the two pulse signals with the frequency (f1'/l, f2'/l) are led to the gate control circuit 4 consisting, for example, of a flip-flop circuit so as to produce the one signal for opening the gate with the pulse signal f1'/l and the other signal for closing the gate with the pulse signal f2'/l. Consequently, the phase difference time between the two pulse signals with the same frequency f1'/l, f2'/l is converted into the opening time interval of the gate control signal, hereby being multiplied with l. Then, by means of the gate control signal the gate circuit 5 is made conductive in such a manner that the pulse signals with the frequency f1 led from the pulse generator 12 pass through the gate 5 during the phase difference time. Hereby, the pulses which have passed through the gate 5 are counted by means of the counter 6, whereby the value counted by means of the counter 6 is latched with the latch circuit 7 every time a pulse signal with f1'/l delivered from the frequency dividing circuit 14 is applied to the latch circuit 7 in such a manner after every latching the counter 6 is reset at "0" so as to start the next counting.

Thus, in the latch circuit 7, the product of the phase difference time between the two pulse signals with the same frequency (f1'/l, f2'/l) with the frequency f1 of the pulse signal produced with the pulse generator 12 so as to be proportional to f1'/l, namely the number of pulses proportional to the phase difference is latched. As explained above, this phase difference is proportional to the transmission error taking place between the gears 1 and 2, namely, the transmission error is obtained from the number of the pulses latched with the latch circuit 7.

However, in case of the above mentioned device, the phase difference is obtained by interpolating the pulse signals delivered from the pulse generator into the phase difference time interval between the pulse signals, which is restricted as follows. Namely, the measurement resolution of the phase difference is determined with the number of pulses P produced by means of the pulse generator 1 per rotation and the multiplying ratio m, namely 360/mP(deg.). Consequently, in order to raise the resolution it is necessary to make m and P as large as possible, whereby it is difficult to make the multiplying ratio correctly so that after all it is necessary to make P larger.

For example, when it is desired to measure the transmission error with the resolution X=1/1200 (deg.) [=3 (sec.)] when the multiplying ratio m of the pulse generator is 4 (the multiplying ratio of 4 is obtained by taking out a pulse at every leading edge and falling edge of the two signals having a phase difference of 90° between each other), it is necessary that the number of pulses P produced by means of the pulse generator per rotation is 108,000 as follows:

$$X = \frac{360°}{mP} = \frac{360°}{4 \times 108,000} = \frac{1}{1200 \text{ (deg.)}} = 3 \text{ sec.}$$

If the number of the pulses generated by means of the pulse generator becomes very large as mentioned above, it is difficult to raise the number of rotations of the shaft of the pulse generator, namely the number of rotations of the gear connected to the shaft of the pulse generator so as to be tested, this parameter being handicapped by the response time of the phototransistor. Generally speaking, the frequency at which the phototransistor can make response, namely the maximum frequency that the pulse generator is allowed to produce is about 100 KHz. Consequently, the maximum number of rotations of the pulse generator is restricted to about 55 rpm, which means the gears are unavoidably tested within the range of rotation number by far smaller than the practical one, which is very inconvenient.

SUMMARY OF THE INVENTION

A purpose of the present invention is to eliminate the shortcomings of the conventional techniques by offering a device so designed that the transmission error taking place between the driving gear and the driven gear can be tested while they are being rotated with the rotation number used in the actual mesh application or close thereto.

Another purpose of the present invention is to offer a device which has almost the same measurement resolution of transmission error as that of the conventional techniques almost under static condition, in the gear mesh test with a rotation frequency used in the actual mesh application or close thereto.

The device in accordance with the present invention consists of the pulse generators connected to the shafts of the driving gear and the driven gear, respectively, the tooth number compensating circuits for dividing the frequencies of the two pulse signals coming from the pulse generators 67 the tooth number of the other gear in mesh thereto, and the pulse difference calculation device for obtaining by calculation the phase difference between the two pulses having the same frequency by means of the tooth number compensation circuits. Consequently, the elements for producing the two pulse signals with the same frequency to be put in the phase difference calculation device, namely, the pulse generators and the tooth number compensation circuits can be conventional.

Thus, the phase difference between the two pulse signals with the same frequencies is proportional to the phase difference time between the two pulse signals and at the same time to the frequency, which is equal to the reciprocal of the period of the pulse signals. Namely, the phase difference is proportional to the product of the phase difference time and the reciprocal of the period.

The phase difference calculation device is intended to obtain the phase difference by calculating the product of the phase difference time with the reciprocal of the period. This phase difference calculation device consists of a time difference calculating device for detecting the phase difference time between two pulse signals for allowing the passage of the clock pulses coming from the clock pulse oscillator only during the phase difference time interval, a reciprocal calculating circuit for producing a function reciprocal to the lapse of time and for latching the value of the function at every period of the pulse signal so as to directly calculate the reciprocal value of the period of the pulse signal and a multiplier for multiplying the number of the clock pulses allowed to pass with the reciprocal value. Consequently, the calculation resolution of the phase difference between the two pulse signals, namely, the measurement resolution of the transmission error proportional to the phase difference is determined by means of the calculation bit of the phase difference calculating device and can be raised sufficiently high. For example, in case of 10 bits, the calculation resolution of 1/1024 can easily be obtained.

As explained above in accordance with the present invention, at the time of calculating the phase difference the product of the phase difference time and the reciprocal value of the period is obtained, so that the measurement resolution can be determined independently of the number P of the pulses produced per rotation of the pulse generators, whereby it is sufficient to determine P with the number of the positions at which the transmission error is desired to be measured per rotation of the gears to be tested.

In an ordinary mesh test, with the exception of special cases, it is often sufficient to measure the transmission error at least at more than four positions per tooth pitch, whereby it is very often requested that the transmission error is measured with the actual rotation number. The reason is that the transmission situation in the actually meshed state offers data effective for the investigation of the countermeasures against the noise and gear shape. Consequently, the pulse number P produced per rotation of the pulse generator can be comparatively small and, in consequence, the pulse generator can produce pulse signals up to a large rotation number so that the test with the rotation number close to the actual case is possible while at the same time the transmission error can be obtained with a high resolution.

DESCRIPTION OF THE PREFERRED EMBODIMENT

The embodiment of the present invention shown in FIG. 2 will be explained below.

Figure 1:
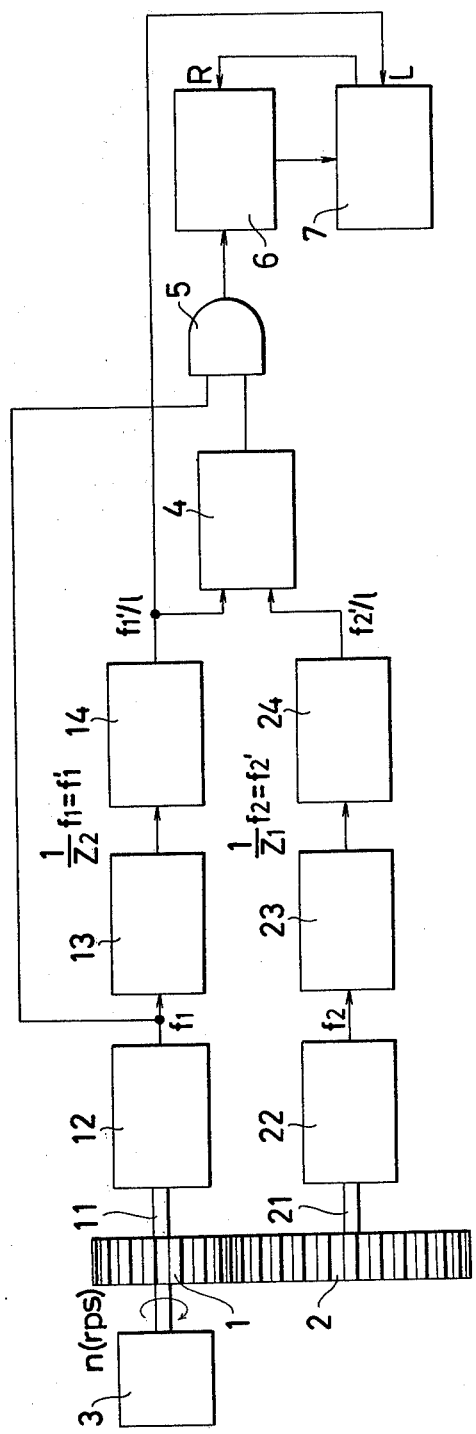
FIG. 1 shows a block diagram for showing the construction of the conventional gear mesh testing instrument.
Figure 2:
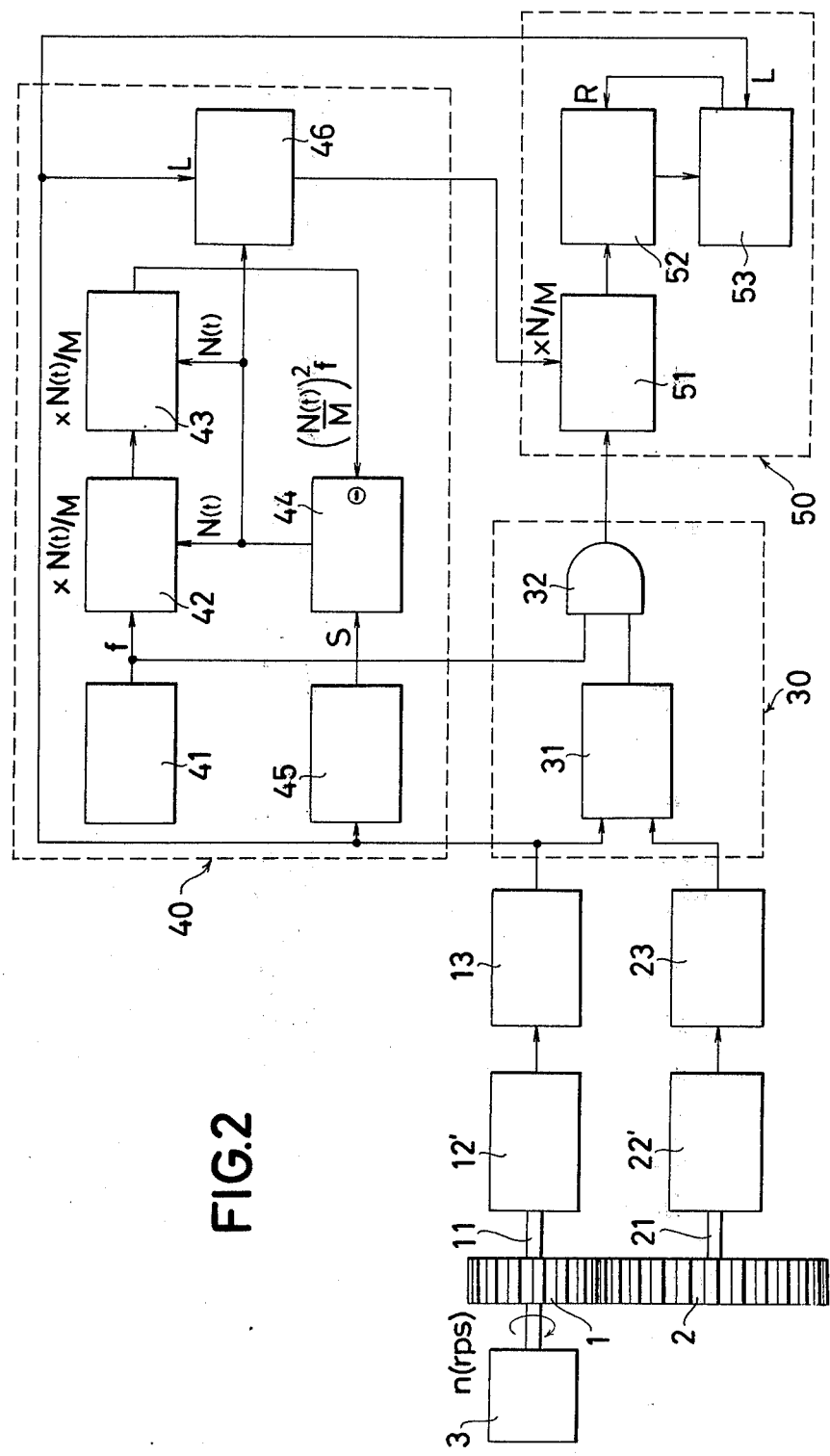
FIG. 2 shows a block diagram for showing a preferred embodiment of the gear mesh testing instrument in accordance with the present invention.

In FIG. 2, the elements having the same figures as those shown in FIG. 1, such as the driving gear 1, the driven gear 2, the shafts 11 and 21, respectively, connected to the gears 1 and 2, respectively the motor 3 connected to the one projecting end of the shaft 11, the pulse generators 12' respectively 22' connected to the shaft 11 respectively 21 and the tooth number compensation circuit 13 respectively 23 to which the pulse signals from the pulse generator 12' respectively 22' is led, are the same element shown in FIG. 1 and operate in the same way as those shown in FIG. 1, whereby the pulse generator 12' and 22' only produces per rotation pulses whose number is smaller than that of the pulses produced by means of the pulse generators 12 and 22, respectively in FIG. 1, so that the figures are provided with a dash "'".

Consequently, when the driving gear 1 is rotated by means of the motor 3, all the elements operate in the same way as those shown in FIG. 1, in such a manner that the tooth number compensation circuits 13 and 14 deliver two pulse signals having the same frequency but a phase difference proportional to the transmission error taking place between the driving gear 1 and the driven gear 2.

Thus, if the phase difference between the above two pulse signals having the same frequency is obtained, the transmission error taking place between the driving gear 1 and the driven gear 2 can be obtained. Thus, the phase difference is proportional to the product of the time of the phase difference between the two pulse signals with the reciprocal of the period. This calculation is carried out by means of a phase difference calculating device consisting of the time difference calculating circuit 30, the reciprocal calculating circuit 40 and the multiplication circuit 50 shown in FIG. 2.

Below, each circuit will be explained in detail in accordance with an embodiment.

The time difference calculating circuit 30 is intended to derive the time of the phase difference between the two pulse signals having the same frequency and delivered from the tooth number compensation circuits 13 and 23, consisting, for example, of a gate control circuit 31 of a Flip-Flop circuit, an AND gate circuit 32, and a clock pulse oscillator 41 (which is used in common with the clock pulse oscillator 41 in the reciprocal calculating circuit 40). The gate control circuit 31 forms a gate control signal whose level is H when the pulse signal from the tooth number compensation circuit 13 is applied thereto and L when the pulse signal from the tooth number compensating circuit 23 is applied thereto and delivers the signal to the one input terminal of the AND gate circuit 32, while to the other input terminal of the AND gate circuit 32 the clock pulses are delivered from the clock pulse oscillator 41. Consequently, the time interval during which the clock pulses pass through the AND gate 32 corresponds to that during which the gate control signal is kept at H level, namely, the time of the phase difference of the two pulse signals from the tooth number compensation circuits 13 and 23. Thus, a group of clock pulses is delivered from the AND gate circuit 32 at every period of the pulse signal, whereby the number of the clock pulses in a group of the clock pulses is proportional to the time of the phase difference. Namely, supposing that the time of the phase difference of the two pulse signals be T' and the frequency of the clock pulses be f, the number of pulses in a group of the clock pulses delivered at every period of the pulse signals is f.T'.

Further, the reciprocal calculation circuit 40 is intended to calculate out the reciprocal of the period of the preceding pulse signal out of the two pulse signals, namely the pulse signal delivered from the tooth number compensation circuit 13. The circuit 40 is roughly divided into two parts in accordance with efficiency. One is the function generating part for producing a function reciprocal to the lapse of time, while the other is the control part for controlling the function generating part so as to deliver the reciprocal function at every period of the pulse signals from the tooth number compensation circuit 13.

The function generating part consists of the clock pulse oscillator 41, the first rate multiplier 42 to which the clock pulses are led from the oscillator 41, the second rate multiplier 43 to which the clock pulses multiplied with a rate in the first rate multiplier 42 are led and the subtraction counter 44 having a subtraction input terminal to which the clock pulses multiplied with a rate in the second rate multiplier 43 are applied so as to be subtracted from an initial value set in advance in such a manner that the numerical value changing from time to time due to the subtraction is delivered to the rate setting terminal of the first and the second rate multipliers 42 and 43. Hereby, the rate multipliers 42 and 43 are also called the thin out circuits. Now, supposing the bit number of the rate multipliers 42 and 43 be b, the rate value is $N/2^b$ when the numerical value N ($N<2^b$) is led from the subtraction counter 44 to the rate setting terminal. Hereinafter, $2^b$ is called calculation capacity of the rate multiplier and represented with M.

Further, the above mentioned subtraction counter 44 is the same as what is known as an up-down counter, whose up terminal is omitted or not used, whereby the pulses are led from the rate multiplier 43 to the down terminal and at whose set terminal the initial value is set. Further, the capacity of the subtraction counter 44 is same as that of the rate multipliers 42 and 43, namely M, while the initial value is also set at M. Consequently, now let the calculation value of the subtraction counter 44 after the lapse of the time t after the start of the subtraction counter 44 be N, the derivative ΔN of the calculation value of the subtraction counter during a small time lapse Δt after then is represented as follows:

$$\Delta N = -(N/M)^2 f \Delta t \qquad (3)$$

f: frequency of the clock pulses.

Namely, frequency f of the clock pulses is multiplied with N/M in the first rate multiplier 42 into (N/M)f and again multiplied with N/M in the second rate multiplier 43 into (N/M)²f, which is subtracted from the calculation value of the subtraction counter 44.

If now the frequency f of the clock pulses is taken sufficient large and the capacity M of the rate multipliers 42, 43 and the subtraction counter 44 also large, ΔN and Δt in (3) can be written dN and dt. Thus, when the equation (3) is integrated, while the calculation value of the subtraction counter 44 when the lapse of time t is 0, namely the initial value M is put in, the calculation value of the subtraction counter 44 at the time t can be calculated as follows.

$$N = \frac{M^2}{f} \cdot \frac{1}{(t + M/f)} \qquad (4)$$

whereby M and f are constant, so that the calculation value N of the subtraction counter 44 is reciprocal to the sum of the time t with a certain determined time M/f.

The above is the function generating part of the reciprocal calculation circuit 40.

The control part of the reciprocal calculation circuit 40 is intended to obtain a calculation value proportional to the reciprocal of the period at every period of the pulse signals, whereby the subtraction start timing of the subtraction counter 44 and the timing for taking out the calculation value are controlled by means of the pulse signal delivered from the tooth number compensation circuit 13. The control part consists of the delay circuit 45 which delays the pulse signals delivered from the tooth number compensation circuit 13 by a certain determined time M/f and forms an instruction signal for instructing the recovery of the subtraction counter 44 at the initial value M and the start of the subtraction and the first latch circuit 46 to which the calculation value is normally led from the subtraction counter 44 and the pulse signals are also led from the tooth number compensation circuit 13 as latch instructions in such a manner that the calculation value is latched at every latch signal.

Consequently, now let the period of the pulse signals delivered from the tooth number compensation circuit 13 be T, so the time t during which the subtraction counter 44 operates the subtraction is $$t = T - M/f \qquad (5)$$

because the subtraction counter 44 starts to operate after the lapse of time M/f after one pulse signal and the calculation value of the subtraction counter 44 is latched when the next pulse signal is delivered. Consequently, the calculation value latched by the first latch circuit 46 at every period of the pulse signals delivered from the tooth number compensation circuit 13 is obtained by putting the equation (5) into (4), the calculation valve being proportional to the reciprocal 1/T of the period of the pulse signals as follows:

$$N = (M^2/f) \cdot (1/T) \qquad (6)$$

The above is the reciprocal calculation circuit 40.

Further, the multiplication circuit 50 is intended to calculate out the phase difference between the two pulse signals by multiplying the number of the clock pulses formed in the time difference calculating circuit 30 so as to be proportional to the phase time difference between the two pulse signals and the calculation value formed in the reciprocal calculation circuit 40 so as to be reciprocal to the period of the pulse signals. The calculation circuit 50 consists of the third rate multiplier 51 with the capacity M, to which the groups of the clock pulses is led from the AND gate circuit 32 of the time difference calculation circuit 30 and to whose rate setting terminal the value N proportional to the reciprocal of the period of the pulse signals latched by the first latch circuit 46 of the reciprocal calculation circuit 40, the counter 52 to which the group of the clock pulses multiplied with N/M in the rate multiplier 51 and the second latch circuit 53 which latches the calculation value of the counter 52 each time the pulse signal is applied from the tooth number compensation circuit 13, whereby the counter 52 is reset to 0 by means of the latch completion signal from the latch circuit 53.

Consequently, the number of the clock pulses T'f delivered from the AND gate circuit 32 is proportional to the phase difference time T' is multiplied in the third rate multiplier 51 with the rate N/M [=(M/f)/T] proportional to the reciprocal of the period of the pulse signals, so that the value C counted with the counter 52 and latched with the second latch circuit 53 at every period of the pulse signals is obtained as follows:

$$C = T' \cdot f \cdot (N/M) = T' \cdot f(M^2/f) \cdot (1/T) \cdot (1/M) = M(T'/T) \qquad (7)$$

Consequently, a value proportional to the product of the phase difference time T' between the two pulse signals with the reciprocal of the period 1/T, namely a value proportional to the phase difference is latched with the latch circuit 53 at every period of the two pulse signals, whereby the phase difference is proportional to the transmission error between the driving gear 1 and the driven gear 2 so that after all the value latched with the latch circuit 53 becomes proportional to the transmission error.

The resolution of the embodiment constructed as explained above is as follows. In order to make the explanation brief, let us now suppose that the number of tooth of the driving gear 1 be equal to that of the driven gear 2, for example 40. Further, let us suppose the number of the pulses generated with the pulse generators 12' and 22' per rotation be 6,000 and the multiplying ratio m be 4. Then, the number of the pulses compensated with the tooth number compensation circuits 13 and 33 is 600 (=6,000×4÷40) per rotation so that after all the transmission error is obtained on 15 points at every tooth pitch 9° (=360÷40).

If then the maximum response frequency of the pulse generators is 100 kHz, the pulse signals can be taken out even at 1,000 rpm so that the test can be carried out while the gear is rotated at a maximum of 1,000 rpm.

On the other hand, it is very easy to design the phase difference calculation device having a calculation resolution up to 1/1000. As one example, when the calculation capacity M of the phase difference calculation device is chosen 1.024, it is sufficient that the clock pulse frequency f of the above embodiment be chosen 1.024 MHz. In this way, in case of the above mentioned reciprocal calculation circuit 40, the reciprocal value of the frequency up to 1 kHz. (corresponding to the frequency of the pulse signals in case the gears rotate at 1,000 rpm) can be calculated with the calculation resolution of 1/1024, as is obviously out of the equation (6). When for example, the frequency 1/T is 1 kHz and 500 Hz, N is 1.024 and 512.

On the other hand in case of the time difference calculation circuit 30, even when the frequency of the pulse signals at which the phase difference time is minimum is 1 kHz, the maximum phase difference time 1/1000(sec.) of the two pulse signals is interpolated by means of the clock pulses of 1.024 MHz into pulse number, so that also the phase difference time is calculated with the resolution 1/1024. Hereby, the calculation resolution until the product of the two values has been calculated is at worst 2/1024, whereby the probability that it is 1/1024 is by far larger. Further, in case it is desired to be severe, it suffice to shift the frequency of the clock pulses to be used for the time difference calculation circuit 30 by one order. In this way, the calculation resolution of the phase difference becomes about 1/1000, while the two pulse signals are produced every time the gears rotate at 360/600(deg.) as explained above, so that the measurement resolution of the transmission error is about 2.2(sec.), at worst 4.4(sec.).

So far, the explanation has been made in accordance with the embodiment. However, the present invention is not limited to the concrete circuits of the embodiment but can be fulfilled in any other embodiments.

Figure 3:
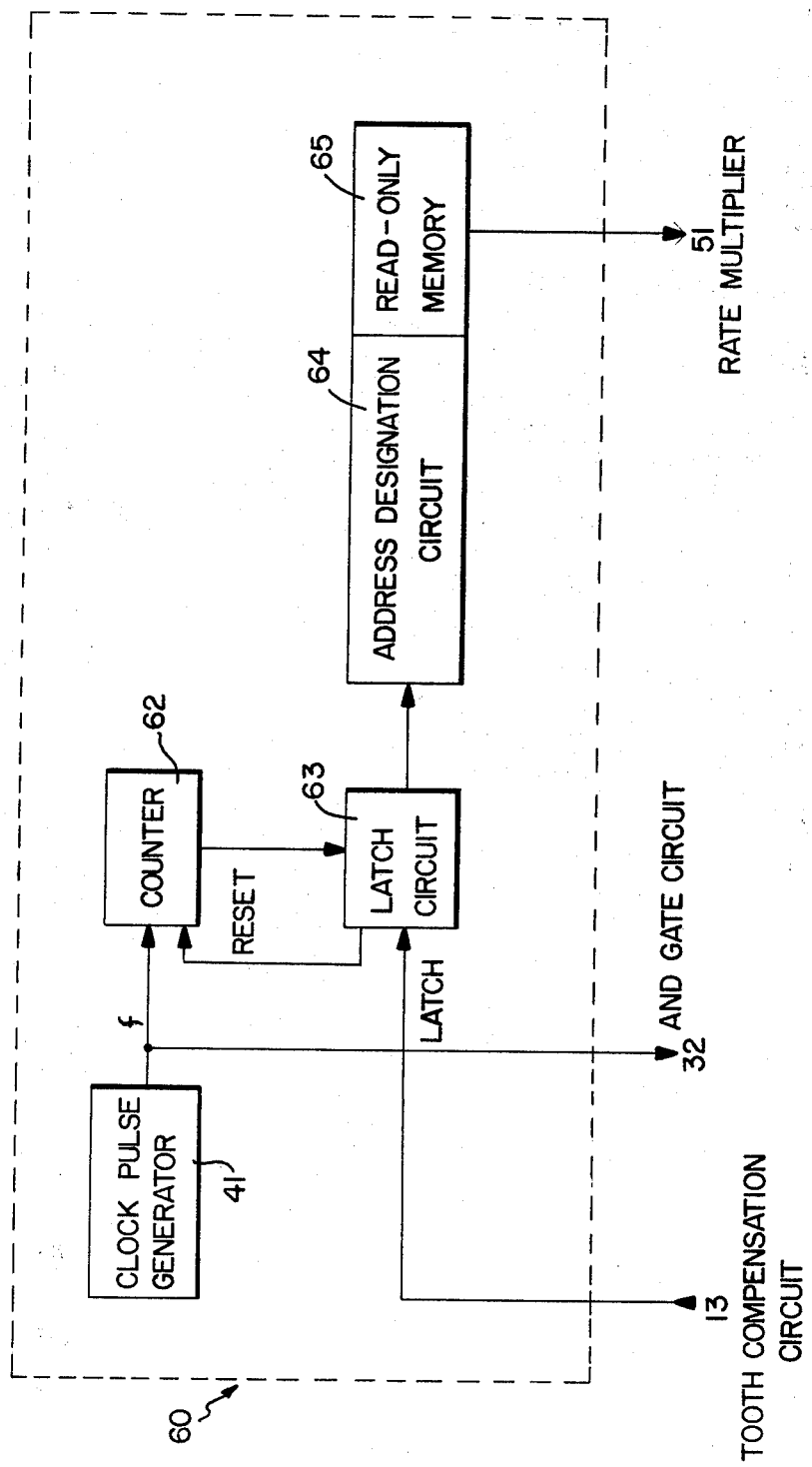
FIG. 3 shows an alternative embodiment of the reciprocal calculation circuit of FIG. 2.

For example, the above mentioned reciprocal calculation circuit 40 can be designed to produce the reciprocal calculation circuit 60 of FIG. 3 so that the reciprocal of the time lapse is calculated out by unit step in advance and written in so as to correspond to the address of a read-only memory 65, while the period of the pulse signal is converted in the pulse number by means of the clock pulses in such a manner that the reciprocal value is read out of the address of the read-only memory, by presentation of an address to address designation circuit 64 corresponding to the pulse number.

Further, as to the above mentioned calculation circuit 50, the case that the clock pulse group is multiplied with a ratio proportional to the reciprocal by means of the rate multiplier is explained. Hereby it is also possible that the clock pulse group is counted by a counter 62 and multiplied directly with the reciprocal of the period by means of the multiplier, whereby the high speed calculation device has already been known.

As explained above, the present invention is characterized in the combination of generating means for producing pulse signals corresponding to the number of rotations of the two gears to be tested with a means for compensating the generated pulse signals into a same frequency, a means for calculating out the reciprocal of the period of the one pulse signal with the same frequency, a means for detecting the phase difference time between the two pulse signals with the same frequency and a means for multiplying the phase difference time with the reciprocal value of the period, whereby it goes without saying that for respective means conventional means can be optionally made use.

As so far is explained in detail in accordance with the embodiment, in accordance with the present invention the phase difference between the two pulse signals is obtained by calculation, so that the calculation resolution can be raised in accordance with the necessity and therefore the number of the pulses generated per rotation by means of the pulse generators for detecting the number of rotations of the gears to be tested can be determined only with the number of the measurement points of the transmission error, so that even under a large number of rotations the gear mesh test can be carried out.

What is claimed is:

1. A gear mesh testing instrument comprising:
   pulse producing means for producing two pulse signals respectively having frequencies proportional to the rotational frequency of the driving gear and the rotational frequency of the driven gear;
   frequency compensation means for compensating the frequencies of the two pulse signals into a same frequency;
   a time difference calculation means for detecting the phase difference time between the two pulse signals with the same frequency;
   a reciprocal value calculating means for calculating out the reciprocal value of the period of a first pulse signal out of the two pulsed signals with the same frequency; and
   a multiplication means for calculating the product of the phase difference time and the reciprocal value of the period.

2. A gear mesh testing instrument in accordance with claim 1, wherein the reciprocal value calculating means includes a clock pulse producing device, a first ratio multiplication device receiving clock pulses from said clock pulse producing device, a second ratio multiplication device to which the output pulses of the first ratio multiplication device are applied, a subtraction counter having an input terminal to which the output pulses of the second ratio multiplication device are fed, said subtraction counter delivering a counted value to the ratio setting terminals of the first and the second ratio multiplication device, a delay circuit for delaying by a predetermined time the preceding pulse signal out of the two for calculating the phase difference so as to deliver it to the subtraction counter as a reset instruction and to a latch circuit to which the counted value is led from the subtraction counter and the counted value of the preceding pulse signals is applied as latch signal.

3. A gear mesh testing instrument in accordance with claim 1, wherein the reciprocal value calculation means includes a read-only memory having addresses corresponding to the time value, the value reciprocal to the time lapse is written at every corresponding time value, and a counter for converting the period of the preceding pulse signal out of the two pulse signals for calculating the phase difference by interpolating the clock pulses and controlling the read-out of the value stored in the address of the read-only memory corresponding to the value.

* * * * *